United States Patent [19]

Hoke et al.

[11] Patent Number: 4,919,510
[45] Date of Patent: Apr. 24, 1990

[54] OPTICAL FIBER CONNECTOR AND METHOD

[75] Inventors: Duane E. Hoke, Corning; Ronald L. Kimball; David E. Quinn, both of Painted Post, all of N.Y.

[73] Assignee: Corning Incorporated, Corning, N.Y.

[21] Appl. No.: 344,611

[22] Filed: May 4, 1989

[51] Int. Cl.$^5$ .............................................. G02B 6/38
[52] U.S. Cl. ............................. 350/96.21; 350/96.15; 350/96.20
[58] Field of Search ............... 350/96.15, 96.16, 96.20, 350/96.21, 96.22

[56] References Cited

U.S. PATENT DOCUMENTS 1,829,429 10/1931 Woods ..................................... 65/45
4,361,380 11/1982 Marazzi ............................ 350/96.21
4,787,697 11/1988 Alrutz et al. ..................... 350/96.20
4,807,959 2/1989 Berkey .............................. 350/96.21

Primary Examiner—John D. Lee
Attorney, Agent, or Firm—William J. Simmons, Jr.

[57] ABSTRACT

Optical fibers are spliced by securing them in end-to-end relationship in a tube. Tinted epoxy is inserted into the bore. One fiber is inserted into the bore until its endface reaches the center thereof. As the second fiber is inserted into the other end of the bore, the length of the epoxy column in the bore is observed to diminish as epoxy is displaced into venting means associated with the bore. When the second fiber begins to buckle, movement thereof is stopped. The central region of the tube is inspected to ascertain the disappearance of the epoxy column. This indicates that the endfaces are in abutment. The tube may contain an integral lens for viewing the fibers in the bore. A stripe of appropriate color on one side of the bore provides the contrast to enhance the visibility of the tinted epoxy.

58 Claims, 2 Drawing Sheets

OPTICAL FIBER CONNECTOR AND METHOD

BACKGROUND OF THE INVENTION

The present invention relates to methods of splicing or connecting optical fibers, to components employed in the fabrication of such splices and connections, and to the resulting article.

Systems employing optical fibers require means to effect the transfer of energy from one fiber to another without undue power loss. Some connectors position optical fibers in end-to-end relationship so that light emanating from one fiber endface is directed into the adjacent fiber endface. U.S. Pat. Nos. 4,763,970, 4,746,189 and 4,807,959 teach methods of effecting the end-to-end alignment of two optical fibers by inserting them into opposite ends of a capillary tube. The technician performing the connection attempts to bring the fiber endfaces into abutment using hand-eye coordination. An index matching substance such as an oil or a glue has been employed at the junction between the fibers to enhance the transfer of light therebetween. The basis for selection of such a substance has been its refractive index and its transparency. The refractive index should be equal to or sufficiently close in value to that of the fiber cores to reduce Fresnel losses. Heretofore, it has been thought that the index matching substance should be transparent in order to minimize the attenuation of light propagating through the thin layer of such substance which extends between the fiber endfaces.

Because of the small size of the fibers, it is difficult for the technician to see the endfaces coming into abutment. It has therefore been conventional practice to continue the inward movement of at least one of the fibers until it begins to buckle, thus ostensibly signifying the abutment of the fiber endfaces. Perhaps due to such factors as the small core diameter of single-mode fibers and the bend sensitivity thereof, an excessive amount of fiber buckling causes excessive connector attenuation. Another possible cause of high attenuation is the occurrence of an obstruction in the capillary tube which prevents fiber-to-fiber contact. When conventional transparent glue is employed, the obstruction may go unnoticed, and the technician may erroneously interpret fiber buckling as an indication of fiber-to-fiber contact.

To aid the technician in this task, some connectors employ a feedback process using power transmission. The craftsperson adjusts the fiber ends while watching a meter indicating the amount of power transmitted from one fiber to the other. The splice is completed when the technician ascertains that the minimum power loss has been achieved. That method requires the use of expensive equipment and the process of connecting the fibers to the measuring equipment is time consuming.

The optical fiber connector disclosed in U.S. Pat. No. 4,787,697 comprises an inner transparent frame containing means defining a fiber aligning groove and an outer transparent sleeve disposed around the frame. A magnifying lens above the frame allows the viewer to see a magnified view of that region of the connector where the optical fibers abut. In one embodiment, the fibers are disposed within a channel contained in the frame, a lid over the frame comprising the magnifying lens. In a second embodiment, the outer sleeve functions as the lens. Since the technician can more easily see the location of the fiber ends, the task of placing the fiber ends in proper position is made less difficult. That patent states that the use of such a magnification lens will increase the probability of obtaining optical connections with low power loss and will also reduce the number of chipped fiber endfaces caused by abruptly bringing the fibers together. The connector of that patent is complex in that it requires the manufacture and subsequent assembly of a plurality of parts.

SUMMARY OF THE INVENTION

In view of the foregoing state of the art, it is an object of the present invention to provide an improved method of splicing optical fibers. More particularly, it is an object of the present invention to provide a reliable optical fiber splicing method which results in low loss connections. Another object is to provide a fiber connection method in which the separation between fiber endfaces during connector fabrication is readily discernible. Another object is to provide an inexpensive capillary tube for the connection of optical fibers.

This invention relates to a method of connecting an optical fiber to an optical component. There is provided a device having a bore which extends to at least one end thereof, an optical component being located within the bore, an end surface of the component being located remote from the end. The optical component could be a lens, an optical waveguide formed by ion exchange, another optical fiber, or the like. The optical fiber is inserted into the bore, a liquid such as a refractive index matching oil or glue positioned in the bore between the end surface of the component and the endface of the fiber. The liquid includes a visibility enhancing agent such as a fluorescent additive or a dye or tint that imparts a color to the liquid. If a fluorescent additive is used, the method must include the step of irradiating the glue with light which causes the additive to fluoresce. The fiber endface is moved within the bore toward the component end surface to displace the liquid through a venting means associated with the bore. The amount of liquid between the fiber endface and the component end surface is detected by means of the visibility enhancing agent to assist in determining the presence of a suitable optical connection between the endface and the end surface. Once a suitable connection has been achieved, the fiber and the component are retained in a fixed relation with respect to one another.

In accordance with one embodiment of this invention two optical fibers are connected within a capillary tube. The tube bore may be circular, triangular or the like, and there may be provided means such as a longitudinal groove adjacent the bore for venting fluid. The tube may have an integral, raised, longitudinally-extending region, the surface of which is curved to form a lens which magnifies the bore. In another embodiment, the tube can be formed of transparent material and can be provided with a stripe of opaque material in that region thereof adjacent the fiber endfaces. One of the fibers is inserted into each end of the bore of the capillary tube, the refractive index matching liquid positioned in the bore between the endfaces of the fibers. The liquid can be inserted into the bore prior to inserting the fibers, or it can be applied to the end of a fiber prior to inserting it into the bore.

The endfaces of the fibers are moved toward each other within the capillary tube to displace the liquid through the venting means associated with the bore. The amount of liquid between the endfaces of the fibers is detected by means of the visibility enhancing agent to assist in determining the presence of a suitable optical connection. The step of moving can be continued until at least one of the fibers begins to buckle, the step of detecting then being carried out by observing the longitudinal length of liquid column between the fiber endfaces. Alternatively, the step of moving can be continued until the amount of liquid between the fiber endfaces can no longer be seen. The fibers can thereafter be advanced toward one another an amount sufficient to create a slight buckle in at least one of them.

After a suitable connection has been achieved, the fibers are retained in a fixed relation. This can be accomplished by hardening the glue, mechanically attaching the fibers to the tube, or gluing the fibers to the ends of the tube.

A further aspect of this invention relates to a splice formed by the above-described method. This splice comprises a tube having first and second opposite ends and a longitudinal bore having liquid residue venting means associated therewith. At least a portion of the tube is sufficiently transparent to permit the viewing of the bore therethrough. Means is provided at both ends of the bore for facilitating the insertion of optical fibers. First and second optical fibers are disposed substantially coaxially within the tube with their endfaces adjacent one another, and an index matching substance containing a visibility enhancing agent is disposed between the optical fibers and in the venting means.

Yet another aspect of this invention concerns a unitary tubular device for the end-to-end connection of two optical fibers. The device comprises a cylinder of transparent material having first and second opposite ends and a bore which extends longitudinally therethrough. The outer surface of the cylinder has a noncircular cross-section. Means is located at each end of the cylinder for facilitating the insertion of optical fibers into the bore. Extending along one surface of the cylinder is a raised longitudinal region having a radius greater than the longitudinally-extending surface regions immediately adjacent thereto. The raised region has a surface, the curvature of which is such that it functions as a lens which magnifies that region of the bore which extends thereunder. In one embodiment, the cylinder has a triangular cross-section.

DESCRIPTION OF THE PREFERRED EMBODIMENTS

The drawings are not intended to indicate scale or relative proportions of the elements shown therein.

Figure 1:
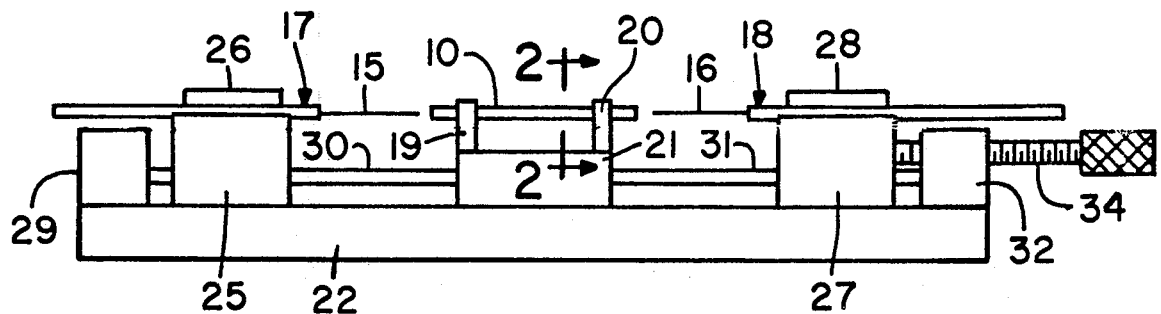
FIG. 1 is a schematic illustration of an apparatus for splicing optical fibers.
Figure 2:
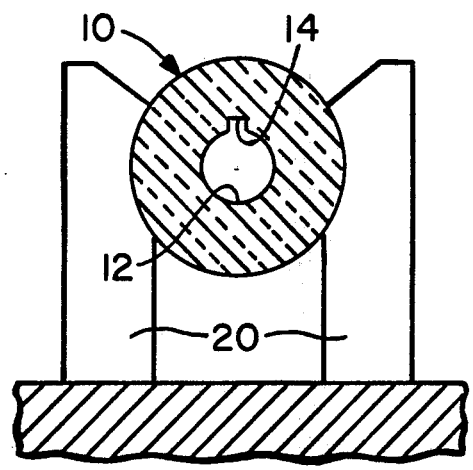
FIG. 2 is a cross-sectional view taken along lines 2—2 of FIG. 1.

FIG. 1 shows a splice assembly fixture for inserting optical fibers 15 and 16 into cylindrical capillary tube 10. As shown in FIG. 2, tube 10 has a longitudinal aperture or bore 12 extending between the ends thereof. Tube 10 is preferably a precision capillary tube, i.e. its bore diameter is controlled to tight tolerances. Whereas the cross-sectional shape of bore 12 is illustrated as being circular, it could have any suitable cross-sectional shape such as triangular, square or the like, which will permit the alignment of fibers therein. The bore may be provided with a longitudinal slot 14 as taught in U.S. Pat. No. 4,763,970 to prevent a pistoning effect when fibers are inserted into opposite ends thereof.

The tube can be formed of any transparent material in which a suitable bore can be formed, glass being preferred for the end-to-end alignment of optical fibers. If the tube is to be formed of glass, for example, it could be a relatively hard glass such as silica or a softer glass such as $SiO_2$ doped with an oxide of lead, boron or the like. Bore 12 may be provided with tapered apertures 41 and 42 (FIG. 5) which form funnel-like entrances to longitudinal bore 12 at end surfaces 43 and 44, respectively. The tapered apertures facilitate the insertion of fibers into bore 12, since the maximum cross-sectional dimension thereof may be less than 200 μm. Tapered apertures can be formed by methods such as those disclosed in U.S. patent application Ser. No. 082,680 entitled "Capillary Splice and Method" filed Aug. 7, 1987 (Berkey 9) (now U.S. Pat. No. 4,822,389) or U.S. patent application Ser. No. 292,550 entitled "Method of Tapering End of Capillary Tube Bore" filed Dec. 27, 1988 (Christoff 1), which are incorporated herein by reference.

Figure 3:
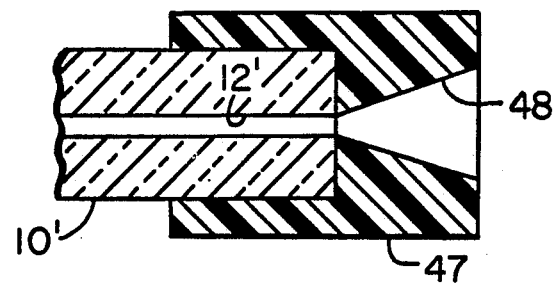
FIG. 3 is a partial cross-sectional view of a modified capillary splice tube.

Other suitable means could be provided for facilitating the insertion of fibers into the tube bore. FIG. 3 shows that an end cap 47 could be inserted onto each end of tube 10'. Tapered aperture 48 of cap 47 is in alignment with bore 12'.

The splice assembly fixture comprises a base 22 on which a centrally located table 21 is fixedly mounted. Stops 29 and 32 are attached to opposite ends of base 22. Slide rods 30 and 31 extend between table 21 and stops 29 and 32. Assembly slides 25 and 27 have bores therein through which rods 30 and 31, respectively, extend. Slide 25 is free to move along rod 30 between stop 29 and table 21. A thumb screw 34 is threaded through stop 32. Slide 27 is free to move between table 21 and the end of thumb screw 34. When thumb screw 34 is backed off so that its end does not protrude from stop 32, slide 27 is free to engage that stop. Located at opposite ends of table 21 are capillary tube holding clamps 19 and 20. Each clamp comprises two vertically extending legs, each of which has an annular recess near the top thereof for receiving tube 10. The holding clamp legs may be formed of a material which is sufficiently resilient to permit them to move outwardly when a capillary tube is pressed downwardly thereon. Slides 25 and 27 have fiber V-grooves in the top surfaces thereof aligned with capillary tube 10. When the coated fiber 17 lies in the V-groove of slide 25, fiber 15 is approximately coaxial with the bore of tube 10. Fiber 16 is similarly aligned when coated fiber 18 lies in the V-groove of slide 27. Retractable fiber holding clamps 26 and 28 hold fibers in the V-grooves of slides 25 and 27, respectively.

An optical fiber splice can be formed as follows, reference being made to the splice assembly fixture of FIG. 1 and to FIGS. 4(a) through 4(e), which illustrate what the technician observes during the consecutive stages of connector fabrication. Even though fibers 15 and 16 are essentially invisible in the bore of tube 10, since the refractive index of the tube is about the same as that of the fibers, the bore is represented by light lines in these figures.

Figure 4A:
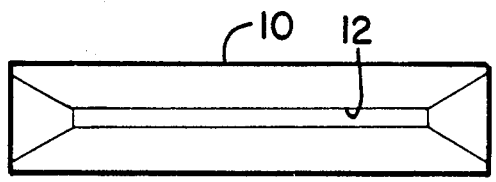
FIGS. 4(a) through 4(e) illustrate sequential steps in the formation of a capillary tube splice.

Thumb screw 34 is rotated to retract it into stop 32, and slide 27 is positioned against stop 32. Slide 25 is positioned against stop 29. Capillary tube 10 of FIG. 4(a) is centered above clamps 19 and 20 and then is gently forced downwardly until it snaps into the clamps. One of the fibers is inserted into each end of bore 12 of tube 10, with an index matching liquid such as glue, oil or the like positioned in the bore between the fiber endfaces. The liquid contains a visibility enhancing agent that enables the technician making the splice to readily ascertain its presence in the tube bore. For example, the liquid may be opaque and/or colored or, it may contain a suitable additive such as a tint that provides it with such a characteristic. A tint must be soluble in the epoxy base, or it must have a small particle size, a particle size less than 5 μm being preferred. Its absorption characteristics must be such that it does not hinder the curing of the epoxy. Suitable tints are Uvex 228H red UV ink manufactured by Uvex Inc. and marketed by Dow Corning, Midland Mich., Solvoil Blue A, a blue powder tint manufactured by Chem Serve Corp., 9505 Copland, Detroit, Mich., and Tint And P.C. 9068 manufactured by Daniel Products, Jersey City, N.J. Suitable UV curable epoxys are MBUV15 manufactured by Master Bond Inc., 154 Hobart Street, Hackensack, N.J. and Dymax 20126 manufactured by Dymax Corporation, 51 Greenwoods Road, Torrington, Conn.

The visibility enhancing agent could also be a fluorescent additive, in which case the splice assembly fixture would further comprise means for irradiating the liquid with light, the wavelength of which would cause the additive to fluoresce. Fluorescent glues are available from Chemserve Corp., Detroit, Mich. and AA Kash Chemical and Dye Stuff, Maywood, Ill.

Figure 4B:
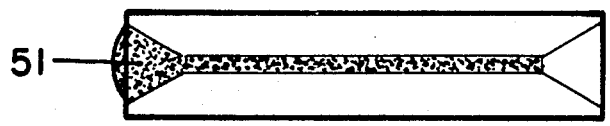

The index matching liquid can be put into the tube bore by applying the liquid to the end of at least one of the fibers and thereafter, inserting the fibers into the bore. A preferred technique is to place a dab 51 of index matching liquid at the end of tube 10 facing slide 25 as shown in FIG. 4(b). The liquid should have a viscosity that is suitable for causing it to wick into bore 12 by capillary action.

Figure 4C:
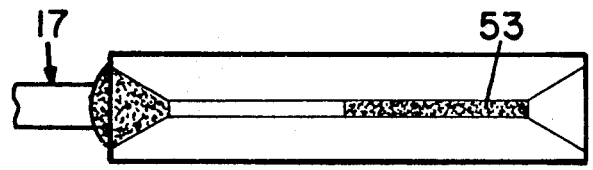

Using a stripping tool, a length of coating is removed from the ends of the two coated fibers, and any remaining coating material is cleaned from the fibers. The uncoated ends of the fibers are square cut to a predetermined length which is such that the fiber coatings will extend into the tapered apertures when the two fiber endfaces abut in the center of the tube. Fiber holding clamps 26 and 28 are retracted and the coated fibers are placed in the V-grooves of slides 25 and 27 as shown in FIG. 1. The coated fibers are visually aligned with respect to some marker on the assembly fixture. For example, the termination of the fiber coating can be located immediately above the edge of a strip of alignment tape (not shown) on base 22. Fiber clamps 26 and 28 are then closed onto the coated fibers. Free-moving slide 25 is moved toward table 21 to cause fiber 15 to enter tube 10, thereby causing the displacement of liquid from that portion of the bore occupied by that fiber. As shown in FIG. 4(c), insertion of fiber 15 is continued until the remaining column 53 of liquid ends at the center of tube 10, thereby indicating the position of the endface of fiber 15. A visual marker such as a scribe line (not shown) on the surface of table 21 may be used to locate the center of tube 10. Thumb screw 34 is rotated to move slide 27 toward table 21. During this portion of the process, the technician can observe the diminishing length of the column of liquid as fiber 16 enters the tube bore. The short length of liquid column 54 of FIG. 4(d) would indicate to the technician that abutment of the fiber endfaces is imminent. Further insertion of fiber 16 would then be made with more care in order to avoid undue fiber buckling. As soon as one of the fibers buckles very slightly, the technician ascertains the lack of a column of liquid between the fiber endfaces to ensure that they are in abutment. When the fibers are completely inserted into the tube, no epoxy is visible between the fiber ends, provided that the ends have been given good quality cleaves. End angles less than 2° are typical.

Figure 4D:
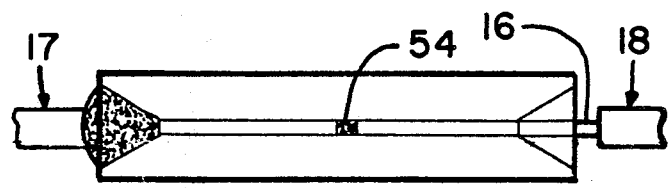
Figure 4E:
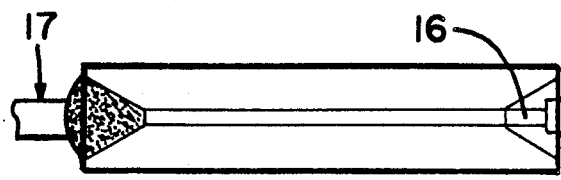

If one of the fibers buckles slightly and an unduly long column of liquid remains in the bore, an amount, for example, as shown in FIG. 4(d), the splicing process is discontinued since it would not result in the formation of a low loss connection. This situation occurs, for example, when an obstruction has initially gone undetected in the bore of the capillary tube. To remedy this situation, the technician can remove the fibers from the tube and either replace the tube or eliminate all of the liquid from the tube bore by running a sufficiently long length of fiber therethrough. The fibers can be cleaned and the above-described process repeated.

When the fiber endfaces are in abutment within the bore of tube 10, coatings 17 and 18 should terminate within the tapered apertures. After a suitable connection has been achieved, the fibers are retained in a fixed relation. Different techniques can be employed to bring about this condition. If the liquid 51 is a glue, it can merely be cured. In a preferred embodiment, wherein the liquid is a UV-curable epoxy, it is cured by directing ultraviolet light thereon.

Figure 5:
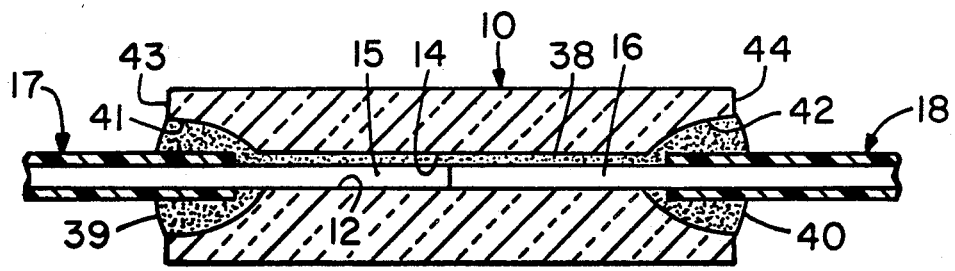
FIG. 5 is a cross-sectional view of a completed splice.

The following alternative techniques can also be employed for retaining the fibers in a fixed relation, these latter techniques being useful for connections having either index matching oil or glue within the capillary tube. Means could be provided for mechanically clamping the fibers to the tube. Alternatively, small dabs 39 and 40 of glue can be deposited at tube ends 43 and 44, respectively, to secure coated fibers 17 and 18 thereto. This embodiment is illustrated in FIG. 5, wherein liquid 38, that has been displaced from the bore by fibers 15 and 16, is shown in keyway 14.

Figure 6:
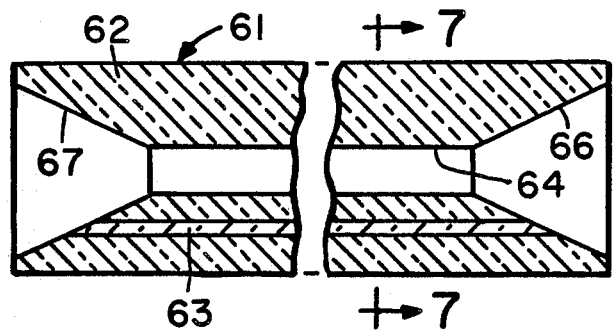
FIG. 6 is a cross-sectional view of a lens-shaped capillary splice tube.
Figure 7:
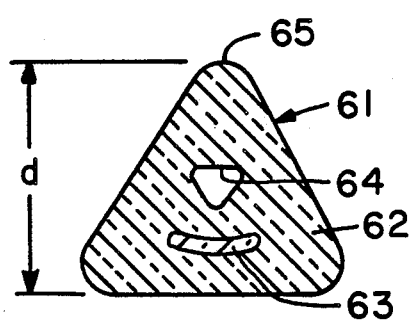
FIG. 7 is a cross-sectional view taken along lines 7—7 of FIG. 6.

FIGS. 6 and 7 show an inexpensive capillary tube having a plurality of features that are useful in the fabrication of splices. A tube having the cross-sectional shape shown in FIG. 7 can be drawn from a melt in accordance with the teachings of U.S. Pat. Nos. 1,829,429 and 2,141,456. An alternative tube drawing apparatus illustrated in U.S. Pat. No. 2,052,269 could also be employed. The tube can be formed of a transparent material 62 which may consist of a lead silicate glass having good UV transmission. The shape of bore 64 is controlled by the shape of a nozzle in the tube drawing apparatus. Whereas bore 64 is illustrated as being triangularly shaped, it could also have other suitable shapes such as circular, square or the like. Drawn within transparent glass 62 is a stripe 63 of a composition the color of which is suitable for contrasting with the liquid which is disposed between the fibers during assembly of the splice. For example, a white stripe could be employed to provide a good contrast with a UV curable epoxy having a blue or red tint. The outer surface of tube 61 is triangularly shaped, the vertices being rounded. Longitudinally-extending vertex region 65 forms a lens which magnifies the contents of bore 64.

Figure 8:
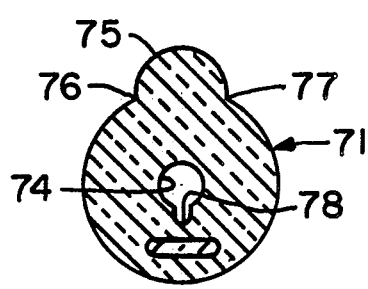
FIG. 8 is a cross-sectional view of a modified lens-shaped capillary tube.

The tube could have any suitable cross-sectional shape which would result in the formation of a lens for magnifying the contents of the bore. For example, tube 71 of FIG. 8 has a circular cross-section except for a raised, longitudinally extending region 75 along one surface thereof. Region 75 has a greater radius than the longitudinally-extending surface regions 76 and 77 immediately adjacent thereto. By "radius" is meant distance from the longitudinal axis of the tube. The curvature of region 75 is such that it functions a lens which magnifies the contents of bore 74. In this embodiment, bore 74 is generally circular in shape and has a longitudinally-extending groove 78 which prevents a pistoning effect when the fibers are moved inwardly against the column of liquid within the bore.

The tube drawing system employed in the fabrication of tube 61 uses active feedback to control hole geometry, size and location. That is, samples of the tubing being produced are measured offline, and process adjustments are made as necessary. A splice tube can be measured with two pin gauges to determine if it has a suitable bore size. During the drawing of the tube, there is a correlation between tube outside diameter (O.D) and bore diameter. The O.D. variations are small enough that large sections of usable glass are clearly identifiable. The initially drawn tube is severed into individual splice tubes 61 which are of suitable length for connecting optical fibers. Each splice tube can be provided with tapered apertures 66 and 67 at the ends of bore 64 by a technique such as that disclosed in the aforementioned U.S. patent application Ser. No. 292,550.

The acceptable loss for optical fiber connectors of the type disclosed herein depends upon the system in which they are employed. Most systems require an attenuation less than 1 dB per splice. Connectors formed in accordance with the present invention consistently meet this requirement, average splice loss being less than 0.3 dB. Losses as low as 0.01 dB have been achieved using time domain reflectometry, a standard measurement technique.

EXAMPLE 1

A splice assembly fixture of the type described in FIG. 1 was employed. A 2.5 cm long silica capillary tube 10 was formed with tapered, funnel-like apertures in the ends of the bore as taught in U.S. patent application Ser. No. 082,680 "Capillary Splice and Method" filed July 7, 1987 (Berkey 9) (now U.S. Pat. No. 4,822,389). The tube had a 126.5 μm diameter circular bore along which there was located a 6 μm wide by 10 μm deep longitudinally-extending groove as taught in U.S. Pat. No. 4,763,970. The capillary tube was affixed to clamps 19 and 20.

A mixture of tint and UV-curable epoxy was prepared. The epoxy was Dymax 20126, an acrylate resin index matched to 1.5 for optical transmission and filtered to 5 micron particle size to remove crystallized material that might have formed therein. The tint was Solvoil Blue A, a blue powder. The mixture contained about 10 wt. % powder. A dab of the tinted epoxy was applied to the left end of the capillary tube.

The fibers 15 and 16 to be connected, which were single-mode fibers, had an outside diameter of 125 μm. About 40 mm of resin coating was removed from each fiber using a stripping tool, and the exposed fibers were cleaned to remove any remaining coating. Each fiber was cleaved to achieve a 12 mm length of uncoated, clean fiber extending beyond the coating. These fibers were suitably positioned on the two slides 25 and 27. Fiber 15 was moved to the position shown in FIG. 4(c). Fiber 16 was then inserted into the tube by rotating thumb screw 34. When the coated portion of fiber 16 extending between tube 10 and slide 27 buckled slightly, further movement of fiber 16 was stopped. Observation of tube 10 revealed that the column of glue, which had previously existed between the endfaces of the two fibers, had now been displaced by the fibers, so that the column was no longer visible. It was noted that the coatings of both fibers terminated within the tapered apertures of the capillary tube. Ultraviolet light was directed onto the center of the tube for about 60 seconds. A small dab of epoxy was then applied to the right hand side of tube 10. A sufficient amount of glue remained at the left end of the tube from the initial application. Ultraviolet light was directed for about 30 seconds onto each end of the tube. The fiber holding clamps 26 and 28 were lifted, and the finished splice was removed from clamps 19 and 20. Splices formed in accordance with this example exhibited average losses between 0.2 and 0.3 dB, losses as low as 0.01 dB having been observed.

EXAMPLE 2

Splices were made as described in Example 1 except that the capillary splice tubes were of the type illustrated in FIGS. 6 and 7 and a different tinted epoxy was employed.

Transparent glass 62 consisted of a soda lead silicate glass of the type disclosed in U.S. Pat. No. 990,607 (issued Apr. 25, 1911). Stripe 63 consisted of an opal lead flint glass of the type disclosed in U.S. Pat. No. 1,721,979. Cross-sectional dimension d of tube 61 was 3.5 mm. Bore 64 was triangular in shape, and its cross-sectional dimension was large enough to receive a 126.5 μm O.D. pin gauge but too small to receive a 127 μm O.D. pin gauge. The capillary tube was mounted with curved surface 65 facing the viewer.

A mixture of tint and UV-curable epoxy was prepared. The epoxy was Master Bond MBUV15, an acrylate resin index matched to 1.5. The tint was Uvex 228H UV ink, a red liquid that is soluble in the epoxy. The mixture contained about 10 wt. % tint. A dab of the tinted epoxy was applied to the left end of the capillary tube. As it wicked through the tube, the epoxy column was magnified by lens-like surface 65. The splices were completed as described in Example 1. When the first fiber and thereafter the second fiber were inserted into the tube, as described in conjunction with FIGS. 4(c) and 4(e), the length of the epoxy column was easily seen in its magnified condition against the white background provided by stripe 63. Splices utilizing tube 61 exhibited an average attenuation between 0.2 and 0.3 dB, losses as low as 0.05 dB having been observed.

We claim:

1. A method of connecting an optical fiber to an optical component comprising the steps of providing a device having a bore which extends to at least one end thereof, an optical component being located within the bore, an end surface of said component being located in said bore remote from said at least one end, inserting said optical fiber into said bore, a liquid with a visibility enhancing agent positioned in said bore between the end surface of said component and the endface of said fiber, moving said fiber endface within said bore toward said component end surface to displace said liquid through a venting means associated with said bore, detecting the amount of liquid between said fiber endface and said component end surface by means of the visibility enhancing agent to assist in determining the presence of a suitable optical connection, and once a suitable connection has been achieved, retaining the fiber and the component in a fixed relation with respect to one another.

2. The method of claim 1 wherein said optical component is another optical fiber.

3. The method of claim 1 wherein said liquid is a glue.

4. The method of claim 3 wherein the step of retaining comprises hardening said glue.

5. The method of claim 1 wherein said visibility enhancing agent is a dye that imparts a color to said liquid.

6. The method of claim 1 wherein the step of moving is continued until no detectable amount of liquid remains between said fiber endface and said component end surface.

7. A method of connecting two optical fibers within a tube comprising inserting one of said fibers into each end of the bore of said tube, a liquid with a visibility enhancing agent positioned in said bore between the endfaces of said fibers, moving the endfaces of said fibers toward each other within said tube to displace said liquid through a venting means associated with the bore of said tube, detecting the amount of liquid between the endfaces of said fibers by means of the visibility enhancing agent to assist in determining the presence of a suitable optical connection, and once a suitable connection has been achieved, retaining the fibers in a fixed relation.

8. The method of claim 7 wherein said liquid is refractive index matching oil.

9. The method of claim 7 wherein said liquid is a glue.

10. The method of claim 9 wherein the step of retaining comprises hardening said glue.

11. The method of claim 7 wherein the step of retaining comprises attaching said fibers to said tube.

12. The method of claim 7 wherein the step of retaining comprises gluing said fibers to the ends of said tube.

13. The method of claim 7 wherein said visibility enhancing agent is a dye that imparts a color to said liquid.

14. The method of claim 7 wherein said visibility enhancing agent is a fluorescing additive, said method further comprising irradiating said glue with light, the wavelength of which causes said additive to fluoresce during the step of detecting.

15. The method of claim 7 wherein said tube has a circular bore and means adjacent said bore defining a longitudinal groove parallel to said bore and in communicating relationship therewith.

16. The method of claim 7 wherein said tube has a triangularly-shaped bore.

17. The method of claim 7 wherein the step of moving is continued until at least one of said fibers begins to buckle, the step of detecting then being carried out by observing the longitudinal length of liquid between said fiber endfaces.

18. The method of claim 7 wherein the step of moving is continued until the amount of liquid between said fiber endfaces can no longer be seen, said fibers thereafter being advanced toward one another an amount sufficient to create a slight buckle in at least one of them.

19. The method of claim 7 wherein the step of moving is continued until no detectable amount of liquid remains between said fibers.

20. The method of claim 7 wherein the step of inserting comprises disposing said liquid in said bore and thereafter, inserting said fibers into said bore.

21. The method of claim 7 wherein the step of inserting comprises applying said liquid to the end of at least one of said fibers and thereafter, inserting said fibers into said bore.

22. The method of claim 7 wherein said tube has an integral, raised, longitudinally-extending region, the surface of which is curved to form a lens which magnifies said bore.

23. The method of claim 7 wherein said tube is formed of transparent material, said tube having a stripe of opaque material in that region thereof adjacent said fiber endfaces.

24. The method of claim 7 wherein said tube has an integral, raised, longitudinal region, the surface of which is curved to form a lens which magnifies said bore, said tube having a stripe of opaque material in that region thereof adjacent said fiber endfaces and diametrically opposed to said longitudinal region.

25. A method of connecting two optical fibers comprising inserting one of said fibers into each end of the bore of a capillary tube having venting means for excess index matching liquid, an index matching liquid with a visibility enhancing agent positioned in said bore between the endfaces of said fibers, moving the endfaces of said fibers toward each other until they are sufficiently close to effect a suitable optical connection, and retaining the fibers in a fixed relation, wherein said index matching liquid contains a visibility enhancing agent, and the step of moving comprises detecting the amount of liquid between the endfaces of said fibers by means of the visibility enhancing agent to assist in determining the presence of a suitable optical connection.

26. The method of claim 25 wherein said liquid is a ultraviolet light-curable glue, the step of retaining comprising directing ultraviolet light on said glue.

27. The method of claim 26 further comprising the step of gluing said fibers to the ends of said tube.

28. The method of claim 25 wherein said visibility enhancing agent is a dye that imparts a color to said liquid.

29. The method of claim 25 wherein the step of moving is continued until at least one of said fibers begins to buckle, the step of detecting then being carried out by observing the longitudinal length of liquid between said fiber endfaces.

30. The method of claim 25 wherein the step of moving is continued until the amount of liquid between said fiber endfaces can no longer be seen, said fibers thereafter being advanced toward one another an amount sufficient to create a slight buckle in at least one of them.

31. The method of claim 25 wherein the step of moving is continued until no detectable amount of liquid remains between said fibers.

32. The method of claim 25 wherein the step of inserting comprises disposing said liquid in said bore and thereafter, inserting said fibers into said bore.

33. The method of claim 25 wherein said tube has an integral, raised, longitudinally-extending region, the surface of which is curved to form a lens which magnifies the contents of said bore.

34. The method of claim 33 wherein said tube is formed of transparent material, said tube having a stripe of opaque material in that region thereof adjacent said fiber endfaces.

35. The article produced by the method of claim 1.

36. An optical fiber splice comprising
a tube having first and second opposite ends and a bore which extends longitudinally therethrough, at least a portion of said tube being sufficiently transparent to permit the viewing of said bore therethrough, mean at both ends of said bore for facilitating the insertion of optical fibers into said bore, and liquid residue venting means associated with said bore,
first and second optical fibers disposed substantially coaxially within said tube with their endfaces adjacent one another, and
index matching substance disposed between said optical fibers and in said venting means, said index matching substance containing a visibility enhancing agent.

37. The optical fiber splice of claim 36 said index matching substance is glue.

38. The optical fiber splice of claim 36 wherein said fibers are glued to the respective ends of said tube.

39. The optical fiber splice of claim 36 wherein said visibility enhancing agent is a dye that imparts a color to said index matching substance.

40. The optical fiber splice of claim 36 wherein said visibility enhancing agent is a fluorescing additive.

41. The optical fiber splice of claim 36 wherein said tube has a circular bore, said liquid residue venting means comprising a longitudinal groove adjacent said bore in communicating relationship therewith.

42. The optical fiber splice of claim 36 wherein said tube has an integral, raised, longitudinally-extending region, the surface of which is curved to form a lens which magnifies said bore.

43. The optical fiber splice of claim 36 wherein said tube has an integral, raised, longitudinal region, the surface of which is curved to form a lens which magnifies said bore, said tube having a stripe of opaque material in that region thereof adjacent said fiber endfaces and diametrically opposed to said lens.

44. An optical fiber splice comprising
a tube having first and second opposite ends and a bore which extends longitudinally therethrough, at least a portion of said tube being sufficiently transparent to permit the viewing of said bore therethrough, means at both ends of said bore for facilitating the insertion of optical fibers into said bore, and vent means fluidly connected with said bore, said tube having an integral, raised, longitudinal region, the surface of which is curved to form a lens which magnifies the contents of said bore,
first and second optical fibers substantially coaxially disposed within said bore with their endfaces adjacent one another, and
index matching substance disposed between said fiber endfaces and in said venting means.

45. The optical fiber splice of claim 44 wherein said index matching substance glue.

46. The optical fiber splice of claim 45 wherein said glue includes a visibility enhancing agent.

47. The optical fiber splice of claim 44 wherein said fibers are glued to the ends of said tube.

48. The optical fiber splice of claim 44 wherein said tube has a circular bore and means adjacent said bore defining a longitudinal groove parallel to said bore and in communicating relationship therewith.

49. The optical fiber splice of claim 44 wherein said tube has an integral, raised, longitudinally-extending region, the surface of which is curved to form a lens which magnifies said bore.

50. The optical fiber splice of claim 44 wherein said tube has an integral, raised, longitudinal region, the surface of which is curved to form a lens which magnifies said bore, said tube having a stripe of opaque material in that region thereof adjacent said fiber endfaces and diametrically opposed to said longitudinal region.

51. A splice tube comprising a cylinder of transparent material having first and second opposite ends and a bore which extends longitudinally therethrough, means at each end of said cylinder for facilitating the insertion of optical fibers into said bore, said cylinder having an integral, raised, longitudinal region, the surface of which is curved to form a lens which magnifies the contents of said bore.

52. The splice tube of claim 51 wherein said cylinder has venting means for removing excess refractive index matching liquid from said bore.

53. The splice tube of claim 51 wherein said cylinder has a circular bore and said venting means comprises means adjacent said bore defining a longitudinal groove parallel to said bore and in communicating relationship therewith.

54. The splice tube of claim 51 wherein said cylinder has a triangularly-shaped bore.

55. The splice tube of claim 51 further comprising a stripe of opaque material in that region of said cylinder adjacent said fiber endfaces.

56. The splice tube of claim 51 wherein said cylinder has a triangularly-shaped cross-section.

57. A unitary tubular device for the end-to-end connection of two optical fibers comprising
a cylinder of transparent material having first and second opposite ends and a bore which extends longitudinally therethrough, the outer surface of said cylinder having a non-circular cross-section,
means at each end of said cylinder for facilitating the insertion of optical fibers into said bore,
a raised longitudinally-extending region along one surface of said cylinder having a greater radius than the longitudinally-extending surface regions immediately adjacent thereto, said raised region having a surface, the curvature of which is such that it functions as a lens which magnifies that region of said bore which extends thereunder.

58. The splice tube of claim 57 wherein said cylinder has a triangularly-shaped cross-section.

* * * * *